(12) United States Patent
Vasilescu

(10) Patent No.: US 12,505,297 B2
(45) Date of Patent: Dec. 23, 2025

(54) DOCUMENT TRANSLATION FEASIBILITY ANALYSIS SYSTEMS AND METHODS

(71) Applicant: SDL Limited, Maidenhead (GB)

(72) Inventor: Rares Ionut Vasilescu, Floresti (RO)

(73) Assignee: SDL Limited, Maidenhead (GB)

(*) Notice: Subject to any disclaimer, the term of this patent is extended or adjusted under 35 U.S.C. 154(b) by 136 days.

(21) Appl. No.: 18/387,954

(22) Filed: Nov. 8, 2023

(65) Prior Publication Data
US 2025/0148210 A1    May 8, 2025

(51) Int. Cl.
*G06F 40/30* (2020.01)
*G06F 16/334* (2025.01)
*G06F 16/338* (2019.01)
*G06F 16/34* (2025.01)

(52) U.S. Cl.
CPC .......... *G06F 40/30* (2020.01); *G06F 16/3347* (2019.01); *G06F 16/338* (2019.01); *G06F 16/34* (2019.01)

(58) Field of Classification Search
CPC .... G06F 40/30; G06F 16/3347; G06F 16/338; G06F 16/34; G06F 40/51
See application file for complete search history.

(56) References Cited

U.S. PATENT DOCUMENTS

| | | | | |
|---|---|---|---|---|
| 11,449,686 | B1* | 9/2022 | Panchal | G06F 40/51 |
| 2015/0120274 | A1* | 4/2015 | Forbush | G06F 40/58 |
| | | | | 704/2 |
| 2015/0378990 | A1* | 12/2015 | Martinez Corria | G06F 40/47 |
| | | | | 704/2 |
| 2016/0170974 | A1* | 6/2016 | Martinez Corria | G06F 40/51 |
| | | | | 704/4 |
| 2018/0143975 | A1* | 5/2018 | Casal | G06F 40/51 |
| 2019/0354593 | A1* | 11/2019 | Rojas | G06F 40/47 |
| 2022/0083746 | A1* | 3/2022 | Chen | G06N 3/044 |
| 2023/0177280 | A1* | 6/2023 | Krishnaiah | G06F 40/58 |
| | | | | 704/2 |
| 2024/0281622 | A1* | 8/2024 | Diggin | G06F 40/279 |
| 2025/0077562 | A1* | 3/2025 | Srinivasa | G06F 16/345 |

* cited by examiner

*Primary Examiner* — Stella L. Woo
(74) *Attorney, Agent, or Firm* — Carr & Ferrell LLP

(57) ABSTRACT

Automatic post-editing of machine translated content is disclosed herein. An example method includes receiving a source document for translation, calculating semantic signatures of text chunks within the source document using an artificial intelligence (AI) model, matching the semantic signatures against a repository of previous translations, and displaying a document-based visualization that includes both semantic and exact matches found in the repository of previous translations.

20 Claims, 6 Drawing Sheets

DOCUMENT TRANSLATION FEASIBILITY ANALYSIS SYSTEMS AND METHODS

CROSS-REFERENCE TO RELATED APPLICATIONS

N/A.

FIELD

The present disclosure pertains to document translation, and more specifically, but not by way of limitation, to document translation feasibility analysis systems and methods.

SUMMARY

A system of one or more computers can be configured to perform particular operations or actions by virtue of having software, firmware, hardware, or a combination of them installed on the system that, in operation, causes or cause the system to perform the actions. One or more computer programs can be configured to perform particular operations or actions by virtue of including instructions that, when executed by a data processing apparatus, cause the apparatus to perform the actions. One general aspect includes a method for a document translation feasibility analysis. The method also includes receiving a source document for translation. The method also includes calculating semantic signatures of text chunks within the source document using an artificial intelligence (AI) model; matching the semantic signatures against a repository of previous translations. The method also includes displaying a document-based visualization that includes both semantic and exact matches found in the repository of previous translations. Other embodiments of this aspect include corresponding computer systems, apparatus, and computer programs recorded on one or more computer storage devices, each configured to perform the actions of the methods.

Implementations may include one or more of the following features. The method may include providing detailed information regarding previous translations used that correspond to the text chunks, including one or more of language, date, and statistics. The text chunks within the source document are segmented based on document structure information. The semantic signatures are computed using a combination of transformer-based models and bidirectional context-based models. The method may include converting each text chunk into a vector representation that captures a semantic meaning using the AI model. The method may include using the semantic signatures to identify fuzzy matches. Matching includes utilizing any of hashing, clustering, and indexing services to expedite identification of semantically similar text chunks. The method may include post-processing the identified text chunks by removing duplicates, ranking matches based on size and similarity score, and recombining smaller, consecutive chunks. The repository of previous translations is populated using bilingual text. The semantic matching further includes a similarity score, length of chunk, translation memory match percentage, positional information, and a historical success rate to evaluate feasibility of translating the source document. The semantic signatures are derived using the AI model that considers context of the source document. Implementations of the described techniques may include hardware, a method or process, or computer software on a computer-accessible medium.

One general aspect includes a system. The system also includes a processor, and a memory for storing instructions, the processor executing the instructions to receive a source document for translation. The system is also configured to calculate semantic signatures of text chunks within the source document using an artificial intelligence (AI) model, and match the semantic signatures against a repository of previous translations. The system is also configured to display a document-based visualization that includes both semantic and exact matches found in the repository of previous translations. The document-based visualization includes visual distinctiveness for the semantic and exact matches relative to one another. Other embodiments of this aspect include corresponding computer systems, apparatus, and computer programs recorded on one or more computer storage devices, each configured to perform the actions of the methods.

Implementations may include one or more of the following features. The system may include providing detailed information regarding previous translations used that correspond to the text chunks, including one or more of language, date, and statistics. The text chunks within the source document are segmented based on document structure information. The semantic signatures are computed using a combination of transformer-based models and bidirectional context-based models. The system may include converting each text chunk into a vector representation that captures a semantic meaning using the AI model. The processor is configured to utilize any of hashing, clustering, and indexing services to expedite identification of semantically similar text chunks. The processor is configured to post-process the identified text chunks by removing duplicates, ranking matches based on size and similarity score, and recombining smaller, consecutive chunks. The semantic matching further includes a similarity score, length of chunk, translation memory match percentage, positional information, and a historical success rate to evaluate the feasibility of translating the source document. Implementations of the described techniques may include hardware, a method or process, or computer software on a computer-accessible medium.

BRIEF DESCRIPTION OF THE DRAWINGS

Exemplary embodiments are illustrated by way of example and not limited by the figures of the accompanying drawings, in which references indicate similar elements.

DETAILED DESCRIPTION OF EXAMPLE EMBODIMENTS

Overview

Figure 1:
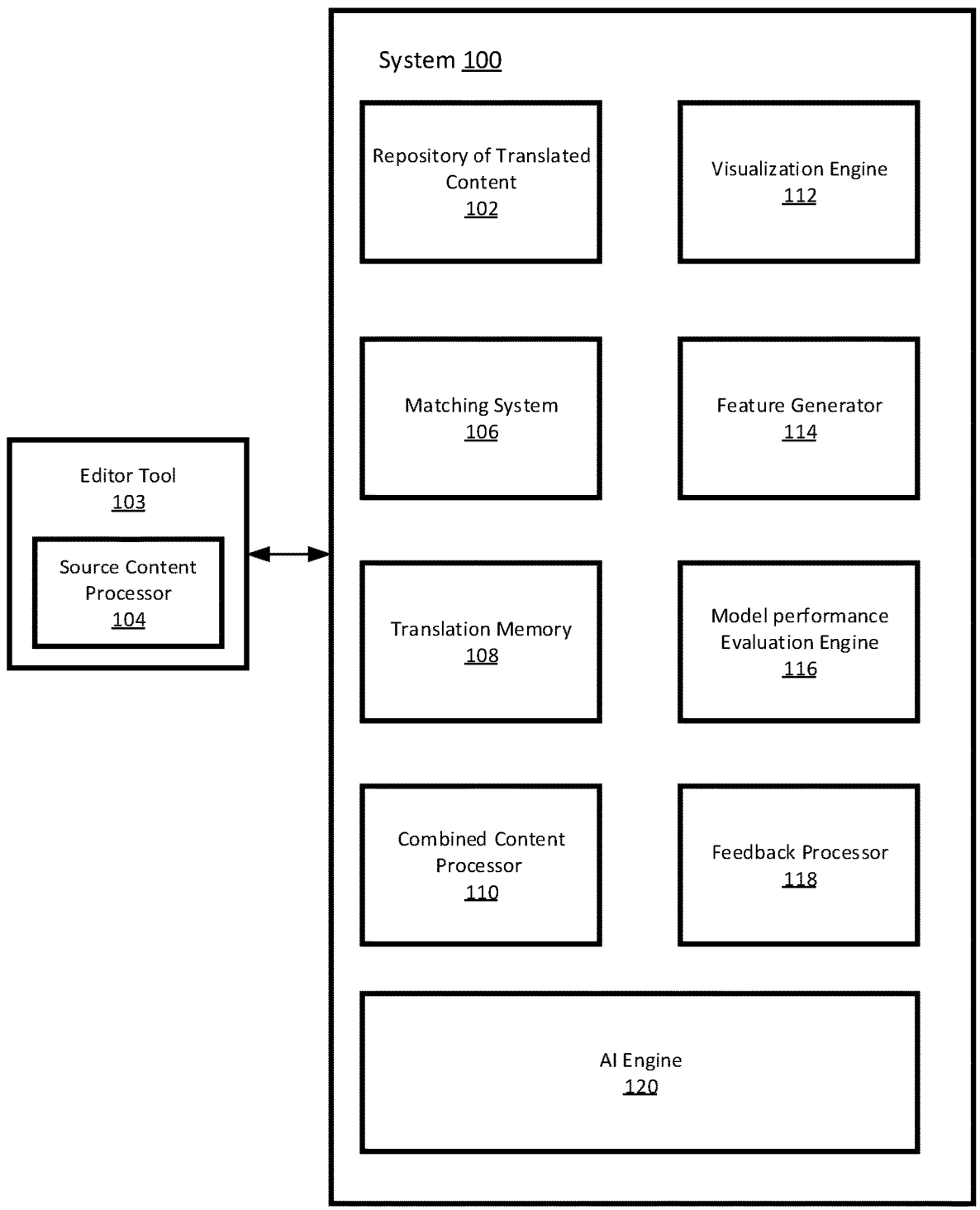
FIG. 1 is an example architectural environment where aspects of the present disclosure can be practiced.

Significant challenges exist in the realm of content localization, which directly impacts content authors and localization project managers. One issue revolves around the effective management of previously translated content. Currently, only localization managers have access to certain tools intended to facilitate this process. These tools typically rely on file names or Translation Memory (TM) segment matches to identify content that has been translated in the past.

However, the limitations of these methods become apparent. First, file names are not always reliable indicators as they can change over time or might not accurately represent the content within. This can lead to either false positives or missed matches, creating confusion and inefficiency in the localization process.

Additionally, TM segment matches, although useful, primarily function at a lexical level. They focus on identifying similar phrases or sentences rather than considering the overall context and meaning of a block of text. Consequently, this approach may not provide a comprehensive view of translated content, and it lacks the ability to distinguish variations between languages, such as content translated in one language but not in another.

Content authors and localization project managers often need access to accurate and context-rich information about previously translated content to streamline their work and ensure consistency across different languages and regions. The absence of a robust system for managing and accessing such content results in inefficiency, potential errors, and difficulties in maintaining content integrity.

The systems and methods disclosed herein offer a pragmatic approach to the challenges associated with managing previously translated content. It operates at the source document level, providing a proactive means of organizing and accessing translations even before the translation process begins. This approach stands out by working outside of traditional translation management systems, seamlessly integrating into content authoring systems, or serving as an authoring stage tool, all while maintaining connectivity with the translation management system. Moreover, the solution employs semantic matching, surpassing simple text-based fuzzy matching by considering the meaning behind text segments for more accurate results.

This approach emphasizes the fusion of semantic similarity with precise matches, allowing for a more refined understanding of the content. Unlike traditional methods that operate at the sentence level, this approach adopts a document-wide context-based analysis. By considering the broader context within documents, it offers a more comprehensive view of translations, enhancing the accuracy and utility of the localization process.

Additionally, it adopts a document-based visualization technique, highlighting entire text blocks rather than individual sentences or segments. This approach offers a holistic perspective on translations within documents. Furthermore, the solution is translation language-aware, offering users insights into previous translations, including language specifics, translation dates, and relevant statistics, empowering informed decision-making regarding content reuse. In essence, the document-based visualization technique will illustrate to the user how much of the content has either exact or semantic matches with information stored in a repository of prior translations. Also, when matches are found, the system can identify related documents that contain the exact or semantic matches.

A noteworthy feature is its ability to facilitate cross-referencing with other documents containing similar text blocks, promoting consistency and coherence across translated content. It does not seek to replace but rather complements traditional translation memory segment matching techniques, ensuring a balanced and adaptable approach to managing translated content. In essence, this solution provides a practical and technically robust solution to the challenges of handling previously translated content, enhancing efficiency and precision in localization efforts.

The systems and methods disclosed herein leverage two distinct types of AI models to tackle the challenge of managing previously translated content effectively. For example, a system can employ transformer-based models, including popular ones like BERT, which are bidirectional and adept at understanding contextual nuances. This is essential for comprehending the intricate context of text segments. Additionally, GPT models can be used, which are unidirectional but excel in generating human-like text. These models contribute to the generation of coherent translations.

Models can be trained on a substantial corpus of bilingual text originating from Translation Management Systems (TMS). This corpus includes the same text translated into multiple languages, making it a valuable resource for supervised learning. Prior to training, the data undergoes preprocessing steps, including lowercasing, removal of special characters, tokenization, and conversion of words into numerical values via word embeddings.

For training and evaluation, optimization algorithms such as Stochastic Gradient Descent and loss functions like Cross-Entropy loss for classification tasks can be used. Text segmentation is conducted at various levels, including sentence, paragraph, and larger text blocks, employing multiple technical approaches like Natural Language Toolkit (NLTK) or SpaCy.

Datasets can be enriched with document structure information from content management systems integrated into TMS. Such structure information can be—but is not limited to CMS information which describes the topic in information architecture held by a piece of text, such as title, footer, header, heading (of various hierarchies), explanatory text, footnote endnote, and/or list item-just to name a few. Other examples could include business-oriented element types, such as it being a "task", a "part", or a "warning". Again, these are meant to be examples and are not intended to be limiting, but are to inform one of ordinary skill in the art.

This allows for the extraction of text features and classification text based on its structural context. Notably, regular Office™-formatted or web page documents (not limited to these documents) can be parsed to identify higher-order structures, facilitating the identification of larger text blocks.

An example system can convert text chunks into vector representations capturing their semantic meaning, utilizing AI models like Word2Vec, GloVe, FastText, or transformer-based models like BERT or GPT. To find the largest matching chunks, a sliding window approach can be used, progressively adjusting the window size and using techniques like hashing, clustering, and indexing services to expedite the process. In the post-processing phase, the system can eliminate duplicates, rank matches based on their size and similarity score, and may recombine smaller, consecutive chunks into larger ones.

A related process involves combining processed text chunks from the source document with their corresponding semantic matches from the existing database, as well as processing each sentence and its related TM matches (exact or fuzzy). These combined inputs are transformed into features essential for subsequent machine learning processing, including similarity score, length of the chunk, TM match percentage, positional information, and historical success rate. A variety of regression models, ranking algorithms, and recommendation methodologies can be used to determine optimal chunk detection.

To evaluate model performance, document sets are used where optimal chunk detection is known, measuring metrics like Mean Average Precision, NNDG (Normalized Discounted Cumulative Gain), or accuracy for classification tasks. Finally, user-provided feedback can be collected and fed into the loop, using it as additional data for model retraining and refinement. These and other features of the present disclosure are set forth herein.

Example Embodiments

FIG. 1 is a schematic diagram of an example translation management system that can be used to practice aspects of the present disclosure. The system 100 can include a repository of previously translated content 102, a source content processor 104, a matching system 106, a translation memory 108, a combined content processor 110, a visualization engine 112, a feature generator 114, a model performance evaluation engine 116, and a feedback processor 118.

The source content processor 104 is a component that can be integrated into an editing tool 103, such as Office™ or any other editor. The source content processor 104 can leverage an AI engine 120 to process source content and provide a visual-based representation of the source content, highlighted with exact or approximate matches from translation memory 108 or other known documents/content by the visualization engine 112.

The AI engine 120 leverages AI techniques, which may include large language models like GPT (Generative Pre-trained Transformer), BERT (Bidirectional Encoder Representations from Transformers), or other transformer-based architectures. These models can be used to understand and generate human-like text.

A large corpus of bilingual text can be used to train AI models used by the AI engine 120. This corpus can come directly from the translation memory 108, where a source text has been translated into multiple languages. This rich dataset provides linguistic diversity, presenting identical texts in varying linguistic contexts.

Within this corpus, translation memory datasets can be used as inputs to the AI model's learning process. These datasets consist of pairs of source texts and their corresponding translations in different languages. They serve as the foundation for a supervised learning approach, allowing the AI model to understand the intricacies of translation and context comprehension. This bilingual text corpus is used to train AI models to recognize linguistic patterns, semantic nuances, and the art of multilingual expression.

A preprocessing routine can also be used and commences with the application of lowercase transformation to the entire corpus. This operation serves to standardize the text, mitigating the impact of letter case variations on subsequent analyses. Additionally, it aids in making text comparisons and pattern recognition case-insensitive.

Following the lowercase transformation, the preprocessing procedure entails the removal of special characters from the text. This operation involves the systematic elimination of punctuation marks, symbols, and any non-alphanumeric characters. This is used in streamlining the text and mitigating noise that may interfere with subsequent linguistic analyses.

The subsequent preprocessing operation involves tokenization, a process of segmenting the text into discrete units, which can be words or subwords, depending on the specific requirements. This segmentation facilitates subsequent text analysis by breaking down the text into meaningful units, enabling language models to process and understand the content more effectively.

Text can also be transformed into numerical values through word embeddings. This can involve converting words into numerical vectors or embeddings, which encapsulate the semantic meaning of each word. These numerical representations enable our language processing models to comprehend the text's content and meaning, ultimately enhancing the accuracy and contextual relevance of subsequent language processing tasks.

In the realm of model training and evaluation, a systematic and rigorous methodology is employed to ensure the efficacy and accuracy of language processing models. During the training phase, optimization algorithms are applied to iteratively adjust the model's parameters, aiming to minimize the predefined loss function. Notably, the Stochastic Gradient Descent (SGD) algorithm can be used in this optimization process. SGD can be used to optimize complex models by making incremental parameter updates based on small, randomly selected subsets of the training data. This stochastic nature enables the model to converge towards an optimal solution efficiently.

In parallel, the choice of loss functions is useful in classification tasks. A Cross-Entropy loss function can be used due to its effectiveness in classification problems. Cross-Entropy loss quantifies the dissimilarity between predicted and actual distributions, providing a measure of how well the model's predictions align with ground truth labels. This loss function serves as another metric during model training, directing the model towards increasingly accurate classification results.

Throughout the training process, comprehensive evaluations are conducted to assess the model's performance using the model performance evaluation engine 116. Evaluation datasets are employed to gauge the model's proficiency in various language processing endeavors. Metrics such as accuracy, precision, recall, and F1-score are computed to quantify the model's classification performance. In addition, other metrics like Mean Average Precision (MAP) and NNDG (Normalized Discounted Cumulative Gain) are employed, depending on the specific task, to assess the quality of ranked outputs.

To implement this segmentation approach, a multitude of technical approaches can be used. These include, but are not limited to, the integration of well-established libraries such as the Natural Language Toolkit (NLTK) and SpaCy. By combining these tools strategically, the system achieves a sophisticated level of text segmentation that goes beyond conventional techniques.

During data-gathering processes, the system can extract valuable insights from document structure information derived from content management systems. This data integration, including systems like DITA-based platforms, provides the system with context. We extract features from the text and categorize them based on the document's structural hierarchy. This approach is equally applicable to various document formats, including regular Office™-formatted documents and web pages. The parsing methodology employed here enables the detection of higher-order structures, allowing us to identify and analyze larger text blocks effectively.

As part of a comprehensive approach, the system can leverage a diverse set of modeling options. These include traditional techniques such as Support Vector Machines (SVM) and Naïve Bayes models, alongside modern neural network-based models. This array of modeling options ensures that the system can select the most appropriate tool for a given task, adapting to the specific demands of each language processing challenge.

Notably, each text chunk is subjected to a transformation into a vector representation, a process that captures its semantic meaning. This transformation is achieved using state-of-the-art AI models, including Word2Vec, GloVe, FastText, and transformer-based models like BERT or GPT. These vector representations facilitate advanced semantic analysis, enabling the system to understand and process the intricate nuances of language and context, ultimately leading to more precise language processing outcomes.

In some instances, the artificial intelligence engine 120 can be executed to calculate semantic signatures for text chunks within the source document created by the source content processor 104. These signatures represent a compact, semantically rich representation of the text, capturing the essence of what is being conveyed.

The AI engine 120 considers the context in which text chunks appear in the document. It takes into account the relationships between sentences and paragraphs to create coherent and contextually relevant semantic signatures. Once semantic signatures are generated for text chunks, they are used to search for matches in the repository of previously translated content 102 by the matching system 106. This involves comparing the semantic signatures of the source text with those of previously translated content.

As will be discussed, the semantic signatures may be used to identify continuous blocks of text that share similar or identical semantic meanings. These blocks are highlighted to provide insights into where translations from the repository of previously translated content 102 may be applicable. Depending on the specific requirements of the translation project or domain, the AI engine 120 can be customized and fine-tuned. This ensures that it aligns with industry-specific terminology and jargon, enhancing the relevance and accuracy of semantic signatures. The AI engine 120 is designed to handle large volumes of text efficiently, making it suitable for processing extensive documents and datasets.

As stated above, the system can be configured to perform text chunking, employing advanced techniques such as natural language parsing, tokenization, and syntactic analysis to segment the source document into text chunks of diverse sizes. These chunks encompass everything from individual sentences and paragraphs to more substantial sections of text. Simultaneously, the system leverages semantic matching algorithms to retrieve corresponding text chunks from the translation memory (TM) 108, using not only exact matches but also semantic similarities to ensure accurate alignment.

In more detail, the system is configured to handle text segmentation and semantic matching. A text segmentation process dissects the source document, resulting in a set of text chunks of varying sizes. Imagine, for instance, a legal document that is split into digestible pieces, ranging from individual sentences to substantial paragraphs. Simultaneously, the system identifies corresponding semantic matching text chunks from one or more databases such as the translation memory 108. For instance, if a legal provision on intellectual property rights is detected within the source document, the processing module fetches the semantically equivalent provision from the translation memory 108, ensuring that the system can effectively align the source and translated content.

In some embodiments, the system is configured to determine the largest matching chunks within textual content. This task aligns source text with its corresponding translations effectively, and it involves a systematic process.

In one embodiment, the system can employ a sliding window approach. In other embodiments, a sized window (user configurable in size), which could encompass an entire paragraph or even a larger section of text can be defined. Within this window, the system scans for potential matches with the desired target content. If, at this stage, no match is identified, the system can adapt by reducing the window size. For instance, the system might shrink it to half a paragraph or even individual sentences, as dictated by the evolving context. This iterative process continues until a desired outcome is achieved, finding a match, or until the window size diminishes to a predefined threshold.

A range of technical techniques can be used to expedite this matching process. Hashing, a method of generating fixed-size representations of text chunks, aids in the rapid identification of potential matches. Clustering allows the system to group similar text chunks, streamlining the matching process by reducing the search space. Additionally, indexing services can be employed, which efficiently organize and retrieve relevant data. These techniques not only enhance the speed of a matching process but also contribute to the overall efficiency and responsiveness of the system.

In summary, these approaches to finding the largest matching chunks within text involve a systematic sliding window method, adapting the window size as needed until a match is found or a threshold is reached. Complementing this approach, the system can employ technical strategies such as hashing, clustering, and indexing services to optimize the matching process, ensuring that it operates with precision and efficiency in handling extensive textual content.

Additionally, in some embodiments, a post-processing method can be used. Post-processing encompasses a range of tasks aimed at refining and optimizing text data for various applications. Among these tasks, one of the focuses is removing duplicate information to ensure data consistency. Additionally, post-processing involves ranking data chunks based on factors like size and similarity scores, enabling the identification of the most relevant and significant insights. Furthermore, post-processing may include the re-combination of smaller, consecutive text chunks into larger, more coherent sections to facilitate a comprehensive understanding of the content. These post-processing operations collectively contribute to enhancing the quality and usability of processed text data across diverse domains.

As noted above, each sentence within the source document can be analyzed. In this context, consider a complex sentence within a technical manual that explains intricate engineering procedures. The system identifies related TM matches, whether they are exact matches or matches with varying degrees of fuzziness. For instance, if the sentence pertains to a specific engineering term like "compression ratio," the module can retrieve related translation memory 108 matches, even if they use synonyms or paraphrased expressions. This comprehensive sentence-level processing ensures that the system captures the full scope of potential translation candidates and aligns them with the source text's context with precision.

Once we have these text chunks, the system can be executed to perform feature extraction via the feature generator 114. The system calculates a Similarity Score, which quantifies the semantic similarity between the source text and TM matches, often relying on cosine similarity or similar metrics. The Length of Chunk feature captures the size of text chunks in terms of words or characters, while TM Match Percentage signifies the degree of overlap between the source text and TM matches. Positional Information encodes the location of text chunks within the source document, offering insights into their structural significance. Historical Success Rate, a dynamic metric informed by historical translation outcomes, provides valuable feedback for decision-making.

Machine learning models can also be used, though outside the scope of this disclosure. However, the system can be configured to generate data that can be used in a machine learning process. These models include regression techniques like linear regression or support vector regression, ranking algorithms such as Learning to Rank (LTR), and recommendation methodologies like collaborative filtering or matrix factorization. Models are trained on diverse datasets encompassing linguistic and contextual variations, ensuring they can handle a wide range of translation scenarios.

The feature generator 114 can be executed to generate features for the machine learning models. One example feature is a similarity score that can be calculated and serves as a metric of interest. The similarity score quantifies the degree of semantic similarity between the source text chunk and its corresponding Translation Memory (TM) matches. This score can be calculated using advanced techniques like cosine similarity or embeddings, providing a numerical representation of how closely the source text aligns with existing translations. For example, if the source text discusses "artificial intelligence," a high similarity score indicates that the TM matches effectively convey the same concept, even if the wording differs. This score is instrumental in selecting the most contextually appropriate translation candidates, ensuring the fidelity of the final translation.

A "length of chunk" feature is essential for document structuring and organization. It provides information about the size of text chunks within the source document, encompassing sentences, paragraphs, or more extensive sections. This data is valuable for segmenting and analyzing the document effectively. For instance, in a technical manual, knowing the length of individual steps or sections aids in maintaining clarity and coherence during translation. It assists our system in adapting translation strategies to accommodate text chunks of varying lengths, ensuring that the final translation remains contextually relevant.

A "TM match percentage" feature quantifies the degree of overlap between the source text and its Translation Memory (TM) matches. It reflects how much of the source text has corresponding translations in the TM repository. For instance, if 80% of a paragraph aligns with previously translated content, the TM Match Percentage would be 80%. This metric guides our system in determining the comprehensiveness of available translations. The TM match percentage can be useful in scenarios where partial matches can still contribute to translation quality, such as legal documents with recurring clauses or disclaimers.

A positional information feature denotes the location of text chunks within the source document's structure. It offers insights into the document's hierarchy, including the sequence of sentences, paragraphs, or sections. This information can be used for maintaining the document's structural integrity during translation. For example, in a user manual, understanding the position of a warning message within a section can be crucial for conveying safety instructions accurately. Positional data enables the system to generate translations that respect the document's layout and organization, ensuring that the translated content remains coherent and user-friendly.

A historical success rate feature provides a historical perspective on how frequently a particular text chunk, or similar chunks, have led to successful translations in the past. It draws from translation history and serves as an indicator of translation quality. For example, if a specific technical term or legal clause has consistently yielded accurate translations, it attains a high historical success rate. This metric informs the system's decision-making process, favoring translations with a proven track record, thereby enhancing overall translation accuracy and reliability.

To guarantee the effectiveness of AI models, the system can rigorously evaluate their performance. The model performance evaluation engine 116 can be executed to determine a Mean Average Precision (MAP) that measures the precision of recommendations, while NNDG quantifies the quality of ranked translation candidates. For classification tasks, accuracy and F1-score may be used to gauge the system's ability to correctly classify text chunks. Expert evaluators validate these metrics, and model adjustments are made based on their feedback.

The feedback processor 118 can process a user feedback loop. This feature allows for continuous learning and adaptation based on user input. Users can provide feedback on the quality and relevance of translation suggestions, enabling our system to refine its recommendations continually. This feedback data is seamlessly integrated into the training pipeline, enhancing the AI engine's ability to adapt to changing language patterns and user preferences over time.

In the end, the combined content processor 110 can take the output from the exact search results of the translation memory 108, as well as the semantic matches from the AI engine 120, and provide these to the visualization engine 112. An example screenshot/visualization can be found in FIG. 2, where both exact and semantic matches are found. Visualizations provide an indication as to the feasibility of translating a source document. For example, if most, if not all of a document is shown visually to have exact or semantic translation matches for the source content, the user will apprehend that translating the source content will likely take little effort. Whereas, source content that has few to little identified text chunks that have exact or semantic matches, the user will understand that the translation process may be difficult or tedious.

Figure 2:
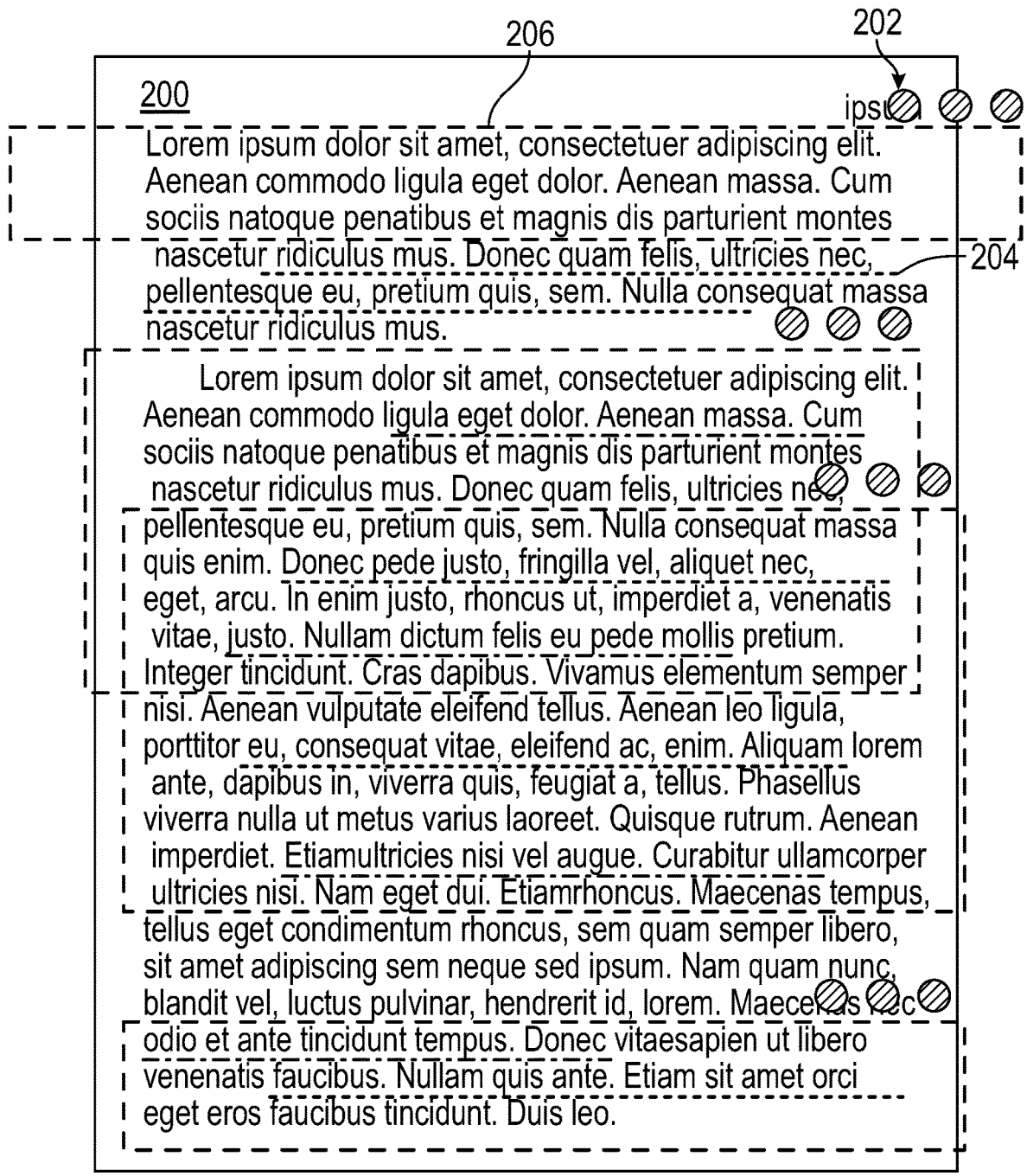
FIG. 2 is a screenshot of a graphical user interface including the output of an automated machine translation system.

FIG. 2 is a screenshot of an example visualization for a source document. The source document 200 includes textual content and the AI engine disclosed above has analyzed the textual content to find text in other documents that are the same, allowing for potential direct reuse. Buttons 202 can be selected to provide the user with insights about section (e.g., links to similar already translated sections, measures of similarity, actions which can be taken by user).

For example, the sub-paragraph 204 is highlighted with configurable window 206, and color-coded to represent the type of match and with specific UX items to provide actionable insights to the user.

Sub-paragraph 204 may be an exact match with text that has already been translated in a repository or translation memory. By contrast, the AI engine also identified that the sub-paragraph 204 was a "fuzzy" match with text that had already been translated in a repository or translation memory. That particular sub-paragraph 204 was identified by examining the surrounding textual content inside the configurable window 206. The visualization can identify exact matches by underlining in a first color, as well as fuzzy matches by underlining in a second color. The visualizations can also include highlighting around the configurable window 206 so that the user can understand the scope of content that was used to make the semantic determination. Again, this visualization combines semantic similarity with exact matches. The visualization and underlying processes illustrate document-wide context-based analysis, not just sentence-by-sentence analysis.

Figure 3:
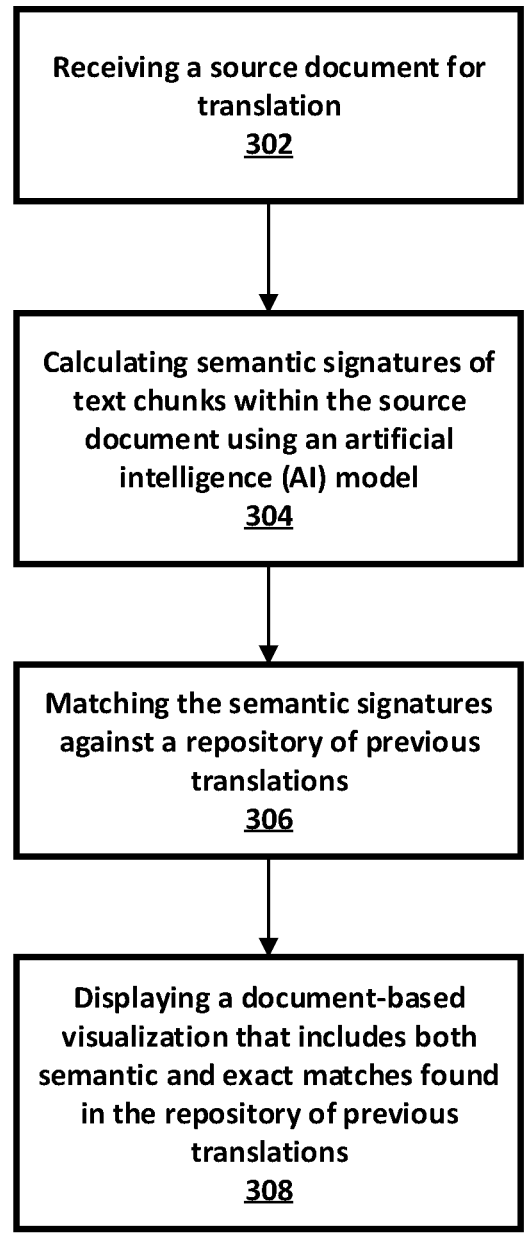
FIG. 3 is a flowchart of an example method of the present disclosure.
Figure 4:
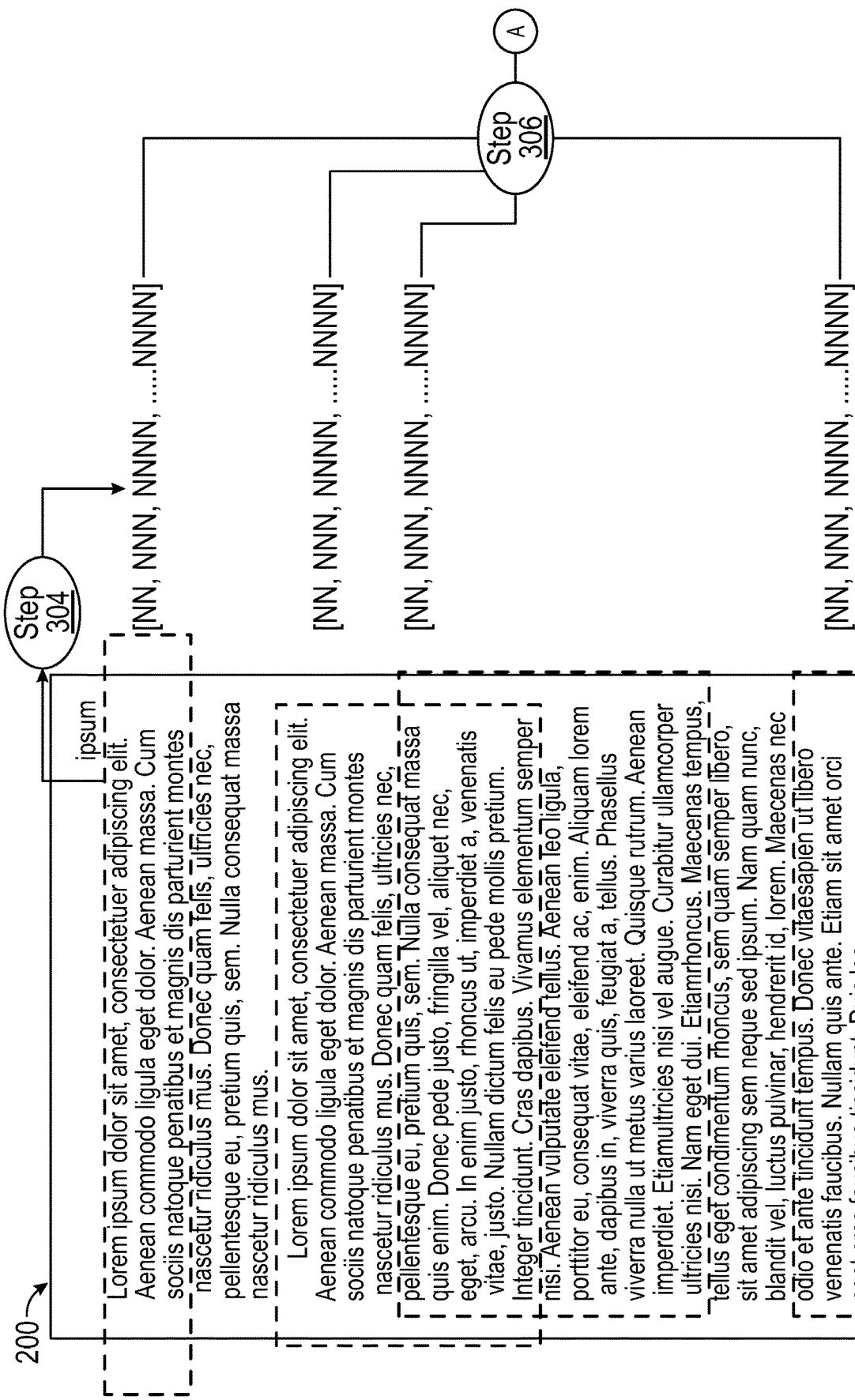
FIG. 4 is a diagrammatic view of the method of FIG. 3.
Figure 4:
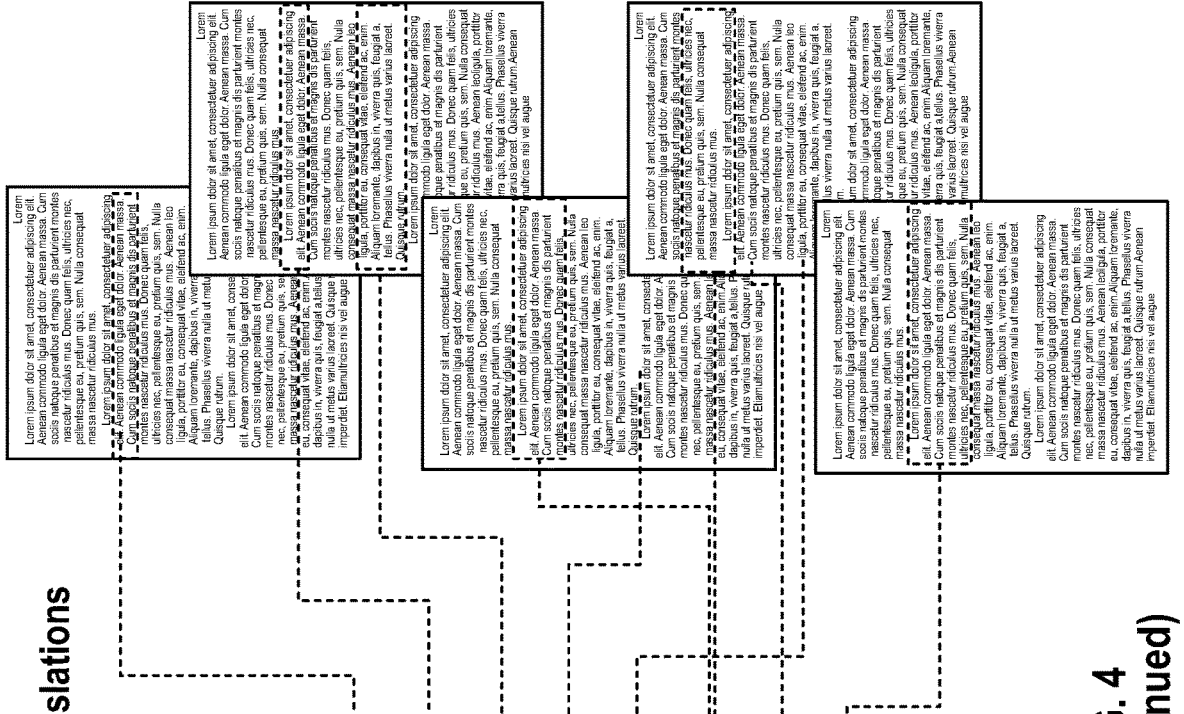

FIG. 3 is a flowchart of a method of the present disclosure. FIG. 3 will be understood within the context of FIG. 4, which provides a diagrammatic view of the flow of the method, namely steps 304 and 306, as well as a visualization that includes links to previously translated segments found in the repository of previously translated content 102.

The method can include a step 302 of receiving a source document for translation. In the method for document translation feasibility analysis, the process initiates by receiving a source document intended for translation. This source document can encompass various textual materials, including documents, web pages, or any other content requiring translation. The system's ability to accommodate a wide range of source document formats ensures its adaptability to diverse translation needs. The source document serves as the foundation upon which subsequent translation feasibility analysis is conducted, making it a pivotal initial step in the process.

Next, the method includes a step 304 of calculating semantic signatures of text chunks within the source document using an artificial intelligence (AI) model. Following the reception of the source document, the method proceeds with the calculation of semantic signatures for text chunks contained within the document. This step leverages the capabilities of an artificial intelligence (AI) model, specifically designed to comprehend and process textual content at a semantic level. Unlike traditional word-level analysis, this AI model delves deeper, dissecting sentences, paragraphs, and individual text chunks to extract their inherent semantic meaning. The AI model ensures a nuanced understanding of the source document's content, capturing entities, relationships, and concepts embedded within. This semantic analysis serves as the cornerstone for subsequent translation feasibility assessments.

The method also includes a step 306 of matching the semantic signatures against a repository of previous translations. With the semantic signatures of text chunks determined, the method proceeds to match these signatures against a comprehensive repository of previous translations. This repository, often referred to as a Translation Memory (TM), houses a wealth of linguistic knowledge derived from prior translation efforts. It not only includes exact matches but also considers semantic similarities, allowing for a more refined alignment between source text and previous translations. This step is instrumental in determining the feasibility of translating the source document, as it identifies sections with existing translations or those with semantically related counterparts (both exact and highly similar/fuzzy). The matching process draws upon the AI model's semantic understanding to ensure accurate and contextually relevant matches.

The method can also include a step 308 of displaying a document-based visualization that includes both semantic and exact matches found in the repository of previous translations. An example visualization can be found in FIG. 2.

The final step of the method involves the generation of a document-based visualization that presents the findings of the translation feasibility analysis. This visualization offers a comprehensive view of the document, highlighting both semantic matches and exact matches discovered within the repository of previous translations. It provides stakeholders, such as translators or project managers, with valuable insights into which portions of the source document can benefit from previous translations and which areas may require more extensive translation efforts. By combining semantic and exact matches in a coherent visual format, this step enhances the decision-making process, enabling efficient allocation of translation resources and optimizing the overall translation workflow.

In some instances, the method can include providing detailed information regarding previous translations used that correspond to the text chunks, including one or more of language, date, and statistics. This additional step enhances the transparency of the translation process by offering insights into the history and characteristics of previous translations. Information such as the language in which previous translations were conducted, the date of translation, and statistical data related to translation quality can aid in making informed decisions regarding the utilization of these translations. This data-driven approach ensures that translators and project managers have access to valuable metadata that influences the feasibility analysis.

In some embodiments, the text chunks within the source document are segmented based on document structure information. This segmentation approach ensures that the translation feasibility analysis operates with a granular understanding of the document's internal organization. By considering the document's structure, such as paragraph breaks, section headers, or other hierarchical elements, the method optimizes the identification and matching of text chunks. This structural segmentation enhances the accuracy of the feasibility assessment, enabling more precise alignment between source and translated content.

In some instances, the semantic signatures are computed using a combination of transformer-based models and bidirectional context-based models. This approach to semantic signature computation leverages the capabilities of state-of-the-art AI models, including transformer architectures like BERT or GPT. By combining transformer-based models with bidirectional context-based models, the method ensures a robust understanding of semantic nuances within the text chunks. This fusion of cutting-edge technologies enhances the quality and depth of semantic analysis, contributing to more accurate translation feasibility assessments.

An example method can include converting each text chunk into a vector representation that captures a semantic meaning using the AI model. This transformation of text chunks into vector representations is achieved through the application of advanced AI techniques such as Word2Vec, GloVe, FastText, or transformer-based models like BERT or GPT. These vector representations encapsulate the semantic essence of each text chunk, enabling the AI model to process and understand content more effectively. This step enhances the accuracy and contextual relevance of subsequent language processing tasks.

In some instances, the method can include using the semantic signatures to identify fuzzy matches. Fuzzy matches refer to semantically similar text chunks that may not be exact translations but share related content or meaning. By utilizing semantic signatures, the method can detect these nuanced similarities, providing a more comprehensive view of potential translation candidates. This capability ensures that even text chunks with varying phrasing or expressions can be considered for alignment, further optimizing the translation feasibility analysis.

One example method can include utilizing any of hashing, clustering, and indexing services to expedite identification of semantically similar text chunks. These technical strategies enhance the efficiency of the matching process by organizing and retrieving relevant data more effectively. Hashing generates fixed-size representations of text chunks, clustering groups similar text chunks together, and indexing services efficiently manage data retrieval. This combination of techniques streamlines the identification of semantic matches, contributing to the overall precision and responsiveness of the system.

Some methods include post-processing the identified text chunks by removing duplicates, ranking matches based on size and similarity score, and recombining smaller, consecutive chunks. This post-processing step focuses on enhancing the quality and usability of processed text data across diverse domains. Activities within post-processing may include removing duplicates to ensure data consistency, ranking matches based on factors like size and similarity score to prioritize relevant insights, and recombining smaller, consecutive chunks for a more coherent understanding of the content. These post-processing operations collectively contribute to optimizing the results of the translation feasibility analysis.

In some instances, the repository of previous translations is populated using bilingual text. This bilingual text corpus serves as a foundational resource for training AI models and enhancing translation feasibility analysis. By sourcing translations from bilingual text, the repository gains linguistic diversity, presenting identical texts in varying linguistic contexts. This diversity enriches the AI model's understanding of translation patterns, semantic nuances, and multilingual expression, ultimately improving the quality and relevance of translation candidates.

In some instances, semantic matching further includes calculating a similarity score, length of chunk, translation memory match percentage, positional information, and a historical success rate to evaluate feasibility of translating the source document. These metrics, which include a similarity score, length of chunk, translation memory match percentage, positional information, and a historical success rate, collectively provide a holistic view of the translation process. The similarity score quantifies semantic similarity, the length of chunk informs structural organization, the translation memory match percentage gauges the comprehensiveness of available translations, positional information aids in document layout preservation, and the historical success rate reflects translation quality based on past outcomes. These metrics ensure a rigorous and multifaceted evaluation of translation feasibility.

The semantic signatures can be derived using the AI model that considers the context of the source document. This context-aware approach ensures that semantic signatures are not solely based on individual text chunks but also take into account the relationships between sentences and paragraphs within the document. By considering context, the method generates coherent and contextually relevant semantic signatures. These signatures, when used in the matching process, enhance the accuracy and alignment of the translation.

Example Use Cases

In a first example use case, a user is a content author working for a multinational technology company. She is tasked with creating a user manual for a new product launch. While authoring the document, she wonders if similar content has been translated into other languages to save time and resources.

The user uses the document translation feasibility analysis system integrated into her content authoring tool. She uploads the source document and initiates the analysis. The system calculates semantic signatures for text chunks within her document and matches them against the company's repository of previous translations.

The system generates a document-based visualization that highlights continuous blocks of text in her document along with corresponding matches from the repository. She can now see which parts of her document have similar content in other languages. She discovers that a significant portion of her document has already been translated into Spanish and German. This information helps her make informed decisions about reusing existing translations, potentially saving time and localization costs for the upcoming product launch.

In another use case, a user is a localization project manager responsible for overseeing multiple translation projects for a global software company. He needs to allocate translation resources efficiently and ensure that each project is assigned to the right team.

He uses the document translation feasibility analysis system to assess the feasibility of translating a new software manual into multiple languages. He uploads the source document and initiates the analysis. The system calculates semantic signatures for text chunks and matches them against the company's extensive repository of previous translations.

The system generates a document-based visualization that shows the user which text blocks in the source document have previous translations available and in which languages, both semantic and exact matches. He can easily identify that the software manual has already been translated into French, Spanish, and Japanese, among others. The system also provides detailed information about the previous translations, including the language, date, and translation statistics.

Based on the analysis, he decides to allocate translation resources to work on the remaining untranslated sections of the manual, prioritizing the languages for which no previous translations are available. This efficient allocation of resources ensures that the localization project proceeds smoothly, minimizing redundancy and maximizing cost-effectiveness.

These use case examples demonstrate how the document translation feasibility analysis method and system can benefit both content authors and localization project managers by providing valuable insights into translation options and optimizing resource allocation in a multilingual content environment.

Figure 5:
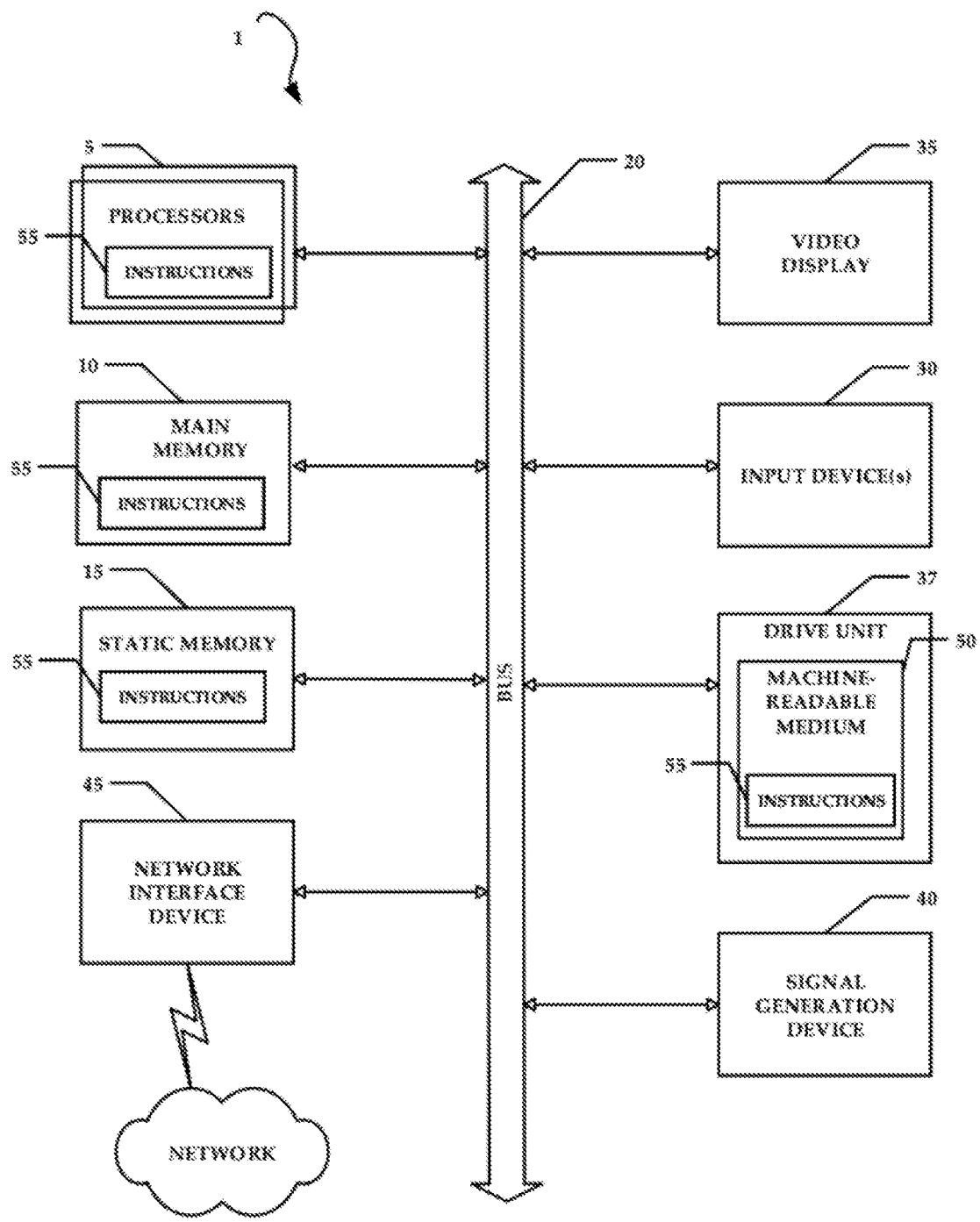
FIG. 5 is a schematic diagram of an example computer system that can be used to implement embodiments of the present disclosure.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method for document translation feasibility analysis, the method comprising:
receiving a source document for translation;
calculating semantic signatures of text chunks within the source document using an artificial intelligence (AI) model;
matching the semantic signatures against a repository of previous translations;
post-processing the text chunks by removing duplicates, ranking matches based on size and similarity score, and recombining smaller, consecutive text chunks; and
displaying a document-based visualization that includes both semantic and exact matches found in the repository of previous translations.

2. The method of claim 1, further comprising providing detailed information regarding the previous translations used that correspond to the text chunks, including one or more of language, date, and statistics.

3. The method of claim 1, wherein the text chunks within the source document are segmented based on document structure information.

4. The method of claim 1, wherein the semantic signatures are computed using a combination of transformer-based models and bidirectional context-based models.

5. The method of claim 1, further comprising converting each text chunk into a vector representation that captures a semantic meaning using the AI model.

6. The method of claim 1, further comprising using the semantic signatures to identify fuzzy matches.

7. The method of claim 1, wherein the matching includes utilizing any of hashing, clustering, and indexing services to expedite identification of semantically similar text chunks.

8. The method of claim 1, wherein the repository of previous translations is populated using bilingual text.

9. The method of claim 1, wherein the matching further includes a similarity score, length of chunk, translation memory match percentage, positional information, and a historical success rate to evaluate feasibility of translating the source document.

10. The method of claim 1, wherein the semantic signatures are derived using the AI model that considers context of the source document.

11. A system, comprising:
a processor; and
a memory for storing instructions, the processor executing the instructions to:
receive a source document for translation;
calculate semantic signatures of text chunks within the source document using an artificial intelligence (AI) model;
match the semantic signatures against a repository of previous translations;
post-process the text chunks by removing duplicates, ranking matches based on size and similarity score, and recombining smaller, consecutive text chunks; and
display a document-based visualization that includes both semantic and exact matches found in the repository of previous translations, the document-based visualization including visual distinctiveness for the semantic and exact matches relative to one another.

12. The system of claim 11, further comprising providing detailed information regarding the previous translations used that correspond to the text chunks, including one or more of language, date, and statistics.

13. The system of claim 11, wherein the text chunks within the source document are segmented based on document structure information.

14. The system of claim 11, wherein the semantic signatures are computed using a combination of transformer-based models and bidirectional context-based models.

15. The system of claim 11, further comprising converting each text chunk into a vector representation that captures a semantic meaning using the AI model.

16. The system of claim 11, wherein the processor is configured to utilize any of hashing, clustering, and indexing services to expedite identification of semantically similar text chunks.

17. The system of claim 11, wherein the repository of previous translations is populated using bilingual text.

18. The system of claim 11, wherein the matching further includes a similarity score, length of chunk, translation memory match percentage, positional information, and a historical success rate to evaluate feasibility of translating the source document.

19. The system of claim 11, further comprising using the semantic signatures to identify fuzzy matches.

20. The system of claim 11, wherein the semantic signatures are derived using the AI model that considers context of the source document.

\* \* \* \* \*